(12) United States Patent
Blais et al.

(10) Patent No.: US 11,655,927 B2
(45) Date of Patent: May 23, 2023

(54) APPARATUS AND METHODS FOR INTERNAL SEALING OF PIPE SYSTEMS

(71) Applicant: HydraTech Engineered Products, LLC, Cincinnati, OH (US)

(72) Inventors: Peter Blais, Cincinnati, OH (US); Michael Fox, Cincinnati, OH (US)

(73) Assignee: HydraTech Engineered Products, LLC, Cincinnati, OH (US)

( * ) Notice: Subject to any disclaimer, the term of this patent is extended or adjusted under 35 U.S.C. 154(b) by 33 days.

(21) Appl. No.: 17/346,926

(22) Filed: Jun. 14, 2021

(65) Prior Publication Data
US 2022/0397223 A1 Dec. 15, 2022

(51) Int. Cl.
*F16L 55/163* (2006.01)

(52) U.S. Cl.
CPC .................. *F16L 55/163* (2013.01)

(58) Field of Classification Search
CPC ............ A44B 11/2584; A44B 11/2592; B65D 63/1027; B65D 63/1054; B65D 63/4081; B65D 2563/103; B65D 63/1081
USPC ........ 24/20 TT, 21, 23 R, 68 BT, 68 D, 270, 24/271, 272, 483, 484, 522, 523, 526, 24/527, 528, 578.15, 589.1, 593.1, 24/593.11, 615, 616, 625, 626, 634, 635, 24/DIG. 43, DIG. 44, DIG. 45, DIG. 46, 24/DIG. 47, DIG. 48, DIG. 52; 74/575, 74/577 M, 577 R, 577 S, 577 SF, 578; 188/134, 196 B, 200; 248/222.12, 248/297.31; 254/108; 292/353; 403/105, 108, 329; 474/136
See application file for complete search history.

(56) References Cited

U.S. PATENT DOCUMENTS

| | | | | |
|---|---|---|---|---|
| 133,921 | A * | 12/1872 | Cole | F16B 7/105 403/321 |
| 950,802 | A * | 3/1910 | Field | A41F 1/008 24/593.1 |
| 1,133,456 | A * | 3/1915 | Bartel | A44B 11/00 24/DIG. 47 |
| 5,035,539 | A * | 7/1991 | Kawafuji | F16L 55/163 405/184.2 |

(Continued)

FOREIGN PATENT DOCUMENTS

| | | | | |
|---|---|---|---|---|
| DE | 3249504 A | * | 5/1984 | ........... F16H 7/0848 |
| DE | 3926879 A1 | | 2/1991 | |

(Continued)

*Primary Examiner* — Kenneth Rinehart
*Assistant Examiner* — Richard K. Durden
(74) *Attorney, Agent, or Firm* — Dorton & Willis, LLP

(57) ABSTRACT

An expandable pipe seal includes a sleeve that is expandable from a first, compact configuration to a second, expanded configuration having a larger outer diameter than the first configuration. The sleeve may be formed from sheet material that is rolled into a cylindrical shape such that a first longitudinal edge of the sheet overlaps a second longitudinal edge of the sheet in a circumferential direction. The sleeve is provided with first and second locking structures that cooperate to facilitate expansion of the sleeve from the first configuration to the second configuration and, thereafter, maintain the sleeve in the expanded configuration. The pipe seal includes sealing structure disposed on an outer surface of the sleeve, and which is compressed against the inner wall of a pipe to be repaired in the second configuration of the sleeve.

13 Claims, 5 Drawing Sheets

(56) References Cited

U.S. PATENT DOCUMENTS

| | | | |
|---|---|---|---|
| 5,444,899 A * | 8/1995 | Koppelomaki | A44B 11/25 24/615 |
| 5,465,758 A | 11/1995 | Graf et al. | |
| 5,738,359 A * | 4/1998 | Gundy | F16L 55/18 277/606 |
| 5,769,459 A | 6/1998 | Graf et al. | |
| 5,868,434 A | 2/1999 | Brakland | |
| 6,276,757 B1 | 8/2001 | Brown | |
| 8,720,907 B2 | 5/2014 | Worley | |
| 8,783,297 B2 | 7/2014 | Hawwa et al. | |
| 9,052,051 B2 | 6/2015 | Maimets et al. | |
| 9,574,695 B2 | 2/2017 | Graf | |
| 10,641,426 B2 | 5/2020 | Graf et al. | |
| 2008/0193221 A1 | 8/2008 | Lee et al. | |
| 2016/0053932 A1 | 2/2016 | Graf et al. | |
| 2016/0281899 A1 | 9/2016 | Graf et al. | |
| 2020/0318765 A1 | 10/2020 | Bechler | |
| 2020/0378542 A1 | 12/2020 | Bonnet | |
| 2021/0131602 A1 | 5/2021 | Wenk | |

FOREIGN PATENT DOCUMENTS

| | | |
|---|---|---|
| DE | 202010013588 U1 | 11/2010 |
| EP | 0543103 A1 | 5/1993 |
| WO | 2017157693 A1 | 9/2017 |
| WO | 2017202493 A1 | 11/2017 |
| WO | 2019158160 A1 | 8/2019 |
| WO | 2019211879 A1 | 11/2019 |
| WO | 202001929 A1 | 1/2020 |

\* cited by examiner

APPARATUS AND METHODS FOR INTERNAL SEALING OF PIPE SYSTEMS

TECHNICAL FIELD

The present invention relates generally to the maintenance and repair of pipe systems and, more particularly, to apparatus and methods for sealing a pipe system from a position within the interior of the pipe system.

BACKGROUND

Pipe systems may be used for transporting various types of fluids, such as fresh water, sewage, and oil and gas, for example. At times it may become necessary to repair a leak in such a pipe system. Some repair systems have been available to seal a leaking pipe from the inside by accessing the interior of the pipe and installing an internal seal at a leak location. Conventional systems for the internal repair of pipe systems are particularly advantageous for use with buried pipe systems because repair can be accomplished without the need to excavate to access the damaged part of the pipe. One type of internal pipe repair system utilizes an expandable metal sleeve that is inserted into the interior of the pipe. The sleeve may include a sealing material disposed on its outer surface, and when the sleeve is in a position near the leak site, the sleeve can be expanded to compress the sealing material against the inner surface of the pipe wall, thereby sealing the leak. Several different mechanisms have been proposed for expandable sleeve-type sealing systems to maintain the sleeve in the expanded state, however, these mechanisms are generally complex and costly. Accordingly, there is a need for improved methods and apparatus for sealing and maintaining pipe systems that overcome these and other drawbacks of conventional sealing mechanisms.

SUMMARY

The present invention provides apparatus and methods for internal sealing of pipe systems. In one aspect, an expandable pipe seal includes a sleeve that is expandable from a first, compact configuration to a second, expanded configuration having a larger outer diameter than the first configuration. The sleeve may be formed from sheet material that is rolled into a cylindrical shape such that a first longitudinal edge of the sheet overlaps a second longitudinal edge of the sheet in a circumferential direction. The sleeve is provided with first and second locking structures that cooperate to facilitate expansion of the sleeve from the first configuration to the second configuration and, thereafter, maintain the sleeve in the expanded configuration. The pipe seal includes sealing structure disposed on an outer surface of the sleeve and which is compressed against the inner wall of a pipe to be repaired in the second configuration of the sleeve.

In another aspect, the first locking structure includes an elongate slot adjacent an axial end of the sleeve and extending in a circumferential direction. The slot defines first and second oppositely disposed sides, and each side of the slot includes a plurality of detent features. The second locking structure includes a spring member formed into a V-shape and having first and second spaced apart terminal ends. The first and second terminal ends of the spring member engage the detent features of the first locking structure such that the spring member deforms to facilitate expansion of the sleeve from the first condition toward the second condition, and the terminal ends of the spring member also engage the detent features to prevent movement of the sleeve in a direction toward the first condition.

In another aspect, a method of sealing a leaking pipe includes inserting an expandable sleeve into the inner diameter of the pipe and expanding the sleeve from a first, compact condition to a second, expanded condition having an inner diameter greater than the first condition. The sleeve includes first locking structure having a plurality of detent features. The sleeve is then locked in the second condition by engaging the detent features with first and second spaced apart terminal ends of a second locking structure comprising a spring member formed into a V-shape to define the first and second terminal ends.

The above and other objects and advantages of the present invention shall be made apparent form the accompanying drawings and the description thereof.

BRIEF DESCRIPTION OF THE DRAWINGS

The accompanying drawings, which are incorporated in and constitute a part of this specification, illustrate exemplary embodiments of the invention and, together with the general description of the invention given above, and the detailed description given below, serve to explain the principles of the present invention.

DETAILED DESCRIPTION

Figure 1:
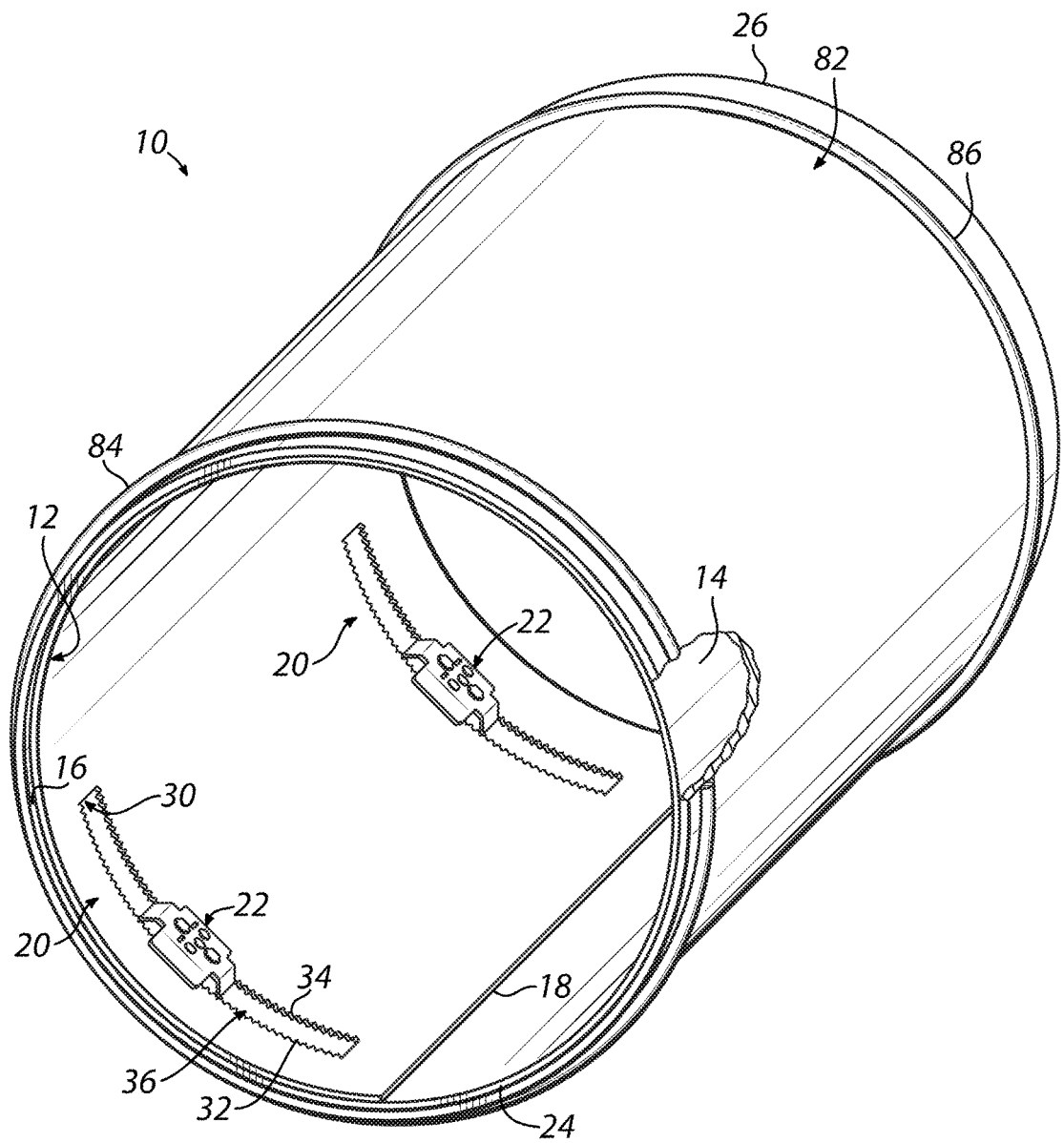
FIG. 1 is a perspective view of an exemplary expandable pipe seal in accordance with the principles of the present disclosure.

FIG. 1 depicts an exemplary pipe seal 10 for repairing pipe leaks in accordance with the principles of the present disclosure. The pipe seal 10 is configured to be introduced within the inner diameter of a pipe and positioned at a location where the pipe is leaking. In this regard, the pipe seal 10 is inserted within the pipe when the pipe seal 10 is in a first, compact configuration, and is thereafter expanded to seal the leak, as described more fully below.

In the exemplary embodiment shown, the pipe seal 10 comprises an expandable sleeve 12 formed from sheet material 14 that has been rolled into a cylindrical shape. Typically, the sheet material 14 comprises steel, however, it will be appreciated that various other materials may alternatively be used which are suitable to maintain the integrity of the seal and retain the expandable sleeve 12 in its expanded condition. The sheet material 14 is rolled such that a first longitudinal edge 16 of the sheet 14 overlaps a second longitudinal edge 18 a sufficient amount so that the diameter of the sleeve 12 may be adjusted by varying the amount of overlap. To maintain the sleeve 12 in an expanded condition, the pipe seal 10 further includes first and second locking structures 20, 22 that cooperate to facilitate movement of the second longitudinal edge 18 relative to the first edge 16 in a direction that expands the diameter of the sleeve 12, but which thereafter prevents relative movement of the second edge 18 in a direction that corresponds to a contraction of the sleeve diameter. In the embodiment shown, first and second locking structures 20, 22 are provided adjacent each of the first and second axial ends 24, 26 of the sleeve 12 for maintaining the sleeve 12 in the expanded condition. While two groups of the first and second locking structures 20, 22 are shown in the exemplary embodiment, it will be appreciated that a pipe seal 10 in accordance with the present disclosure may alternatively include more than two groups of first and second locking structures 20, 22, or may have only a single group of first and second locking structures 20, 22 to maintain the sleeve 12 in the expanded condition.

With continued reference to FIG. 1, the first locking structure 20 of the disclosed embodiment comprises an elongate slot 30 formed in the sheet material 14 near the second longitudinal edge 18. The slot 30 extends in a generally circumferential direction of the sleeve 12 and is defined by first and second oppositely disposed sidewalls 32, 34. The slot 30 is configured to cooperate with the second locking structure 22 in order to maintain the sleeve 12 in the expanded condition. To this end, the slot 30 includes a plurality of detent features 36 provided on the first and second sidewalls 32, 34. The function of these detent features 36 will be appreciated from the description of the second locking structure 22 below.

Figure 3:
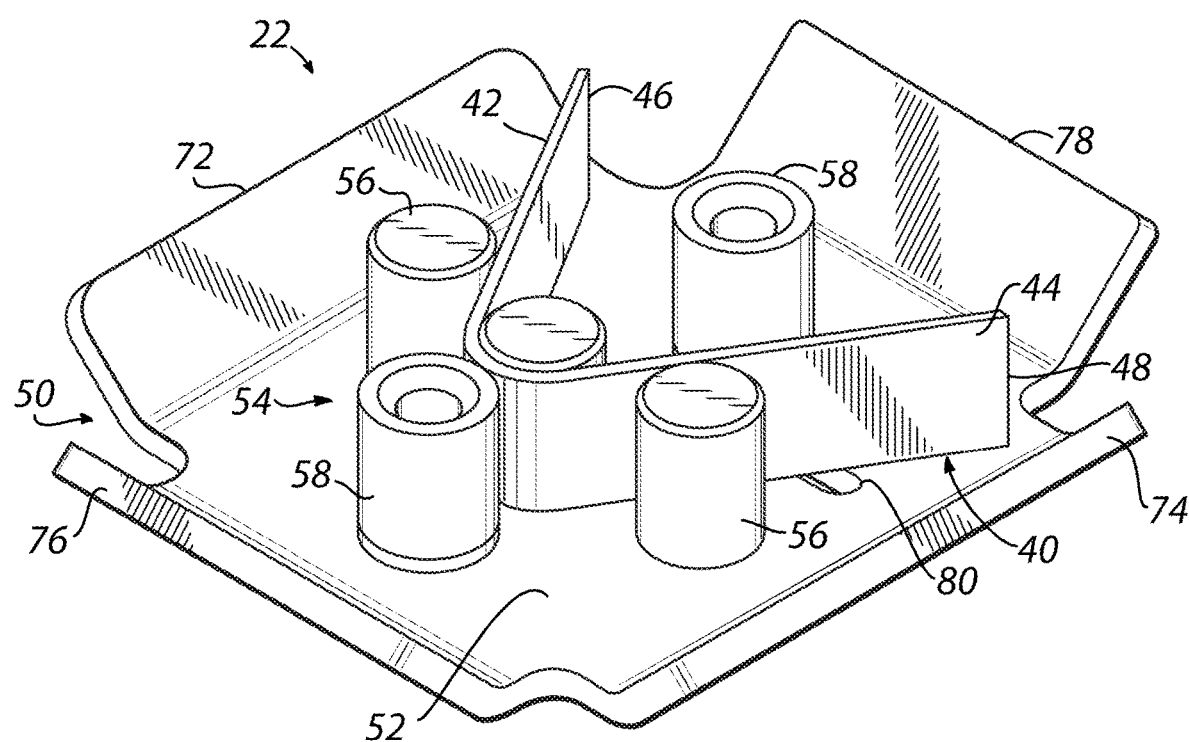
FIG. 3 is a perspective view of an exemplary locking device for use with a pipe seal in accordance with the principles of the present disclosure.
Figure 4A:
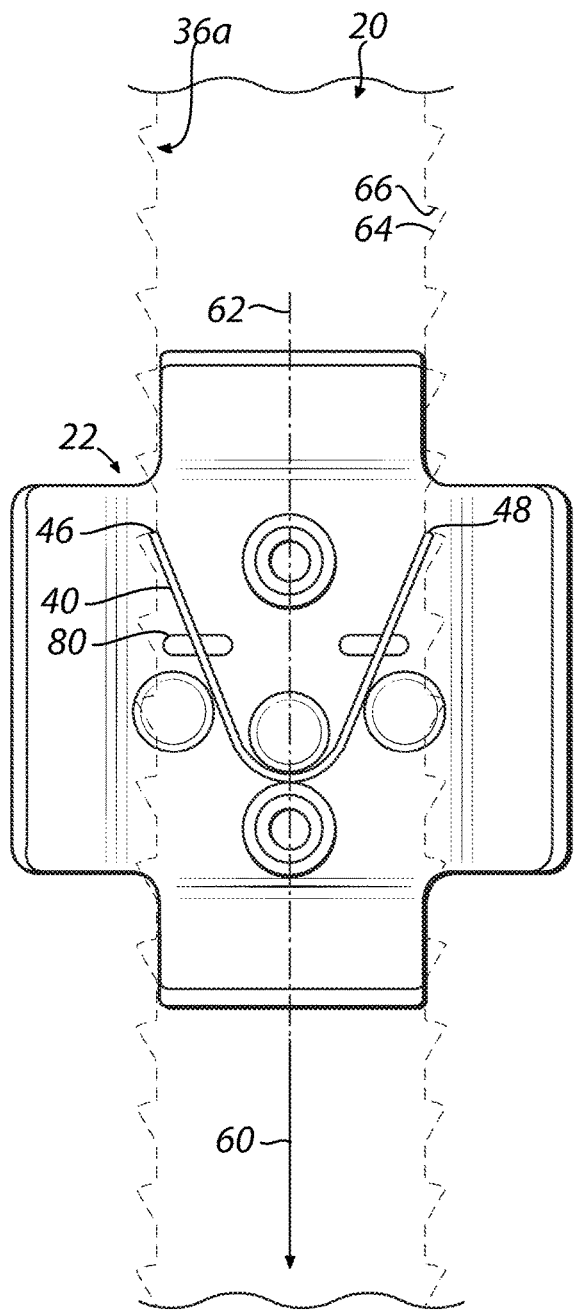
FIG. 4A is a plan view of the locking device of FIG. 3 coupled with a first type of locking structure.
Figure 4B:
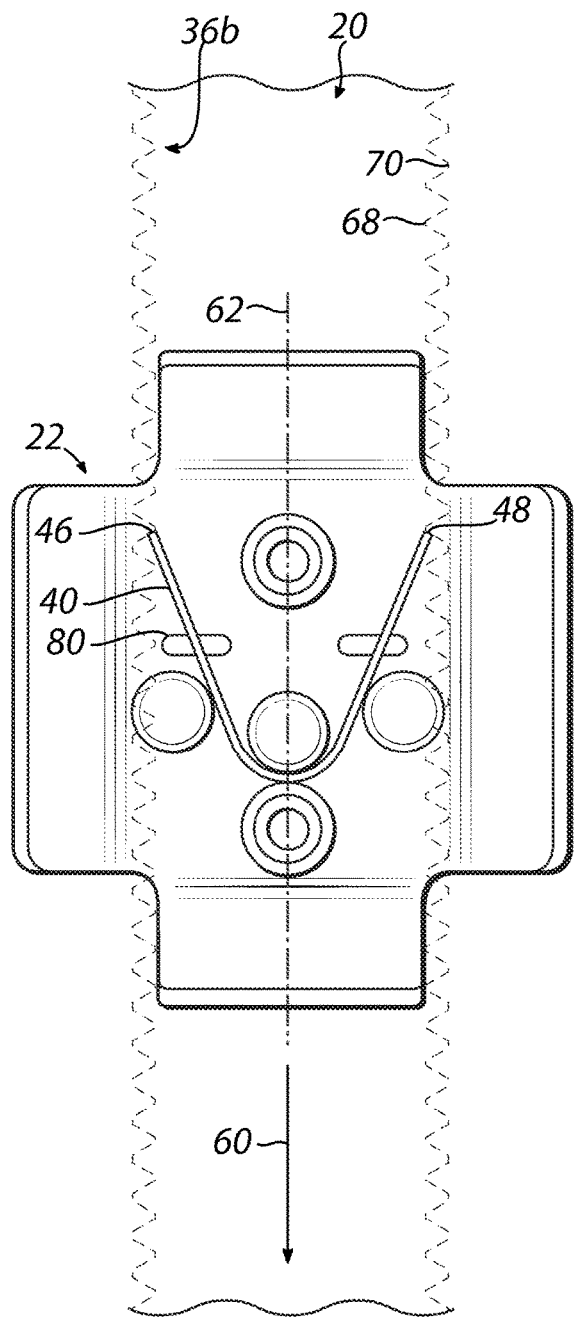
FIG. 4B is a plan view of the locking device of FIG. 3 coupled with a second type of locking structure.

With continued reference to FIG. 1, and referring further to FIGS. 3, 4A, and 4B, the pipe seal 10 further includes second locking structure 22 coupled with the sheet material 14 at a position nearer to the first longitudinal edge 16, such that the second locking structure 22 is aligned with the first locking structure 20 when the sheet material 14 is rolled to form the sleeve 12. In the embodiment shown, the second locking structure 22 comprises a V-shaped spring member 40 having first and second legs 42, 44 with respective first and second spaced apart terminal ends 46, 48 configured to engage the detent features 36 of the slot 30 of the first locking structure 20. The second locking structure 22 further includes a carrier 50 supporting the spring member 40 and coupling the spring member 40 with the sheet material 14. In the embodiment shown, the carrier 50 comprises a generally planar base 52 having spring capture structure 54 for supporting and positioning the spring member 40 on the base 52. The spring capture structure 54 comprises a plurality of spaced apart pins 56 arranged to receive the spring member 40 therebetween. In the embodiment shown, three pins 56 are provided, however, it will be appreciated that a different number of pins 56 may alternatively be used to position the spring member 40 on the base 52. The second locking structure 22 further comprises at least one fastener 58 configured to secure the carrier 50 with the sheet material 14. In the embodiment shown, two fasteners 58 are provided in the form of threaded standoffs that are sized to maintain a spacing between the base 52 of the carrier 50 and the sheet material 14. The threaded standoffs 58 are configured to receive corresponding threaded fasteners (not shown) that are attached to the sleeve 12 through apertures (not shown) provided in the sheet material 14. While the second locking structure 22 is shown and described herein as being fastened to the sheet material 14 by threaded standoffs 58, it will be appreciated that the second locking structure 22 may alternatively be coupled with the sleeve 12 by various other methods.

With continued reference to FIG. 3, and referring further to FIGS. 4A and 4B, the engagement between the first and second locking structures 20, 22 is described in more detail.

In the assembled condition of the pipe seal 10, the first and second locking structures 20, 22 are aligned as generally illustrated in FIGS. 4A and 4B. In particular, the first and second terminal ends 46, 48 of the V-shaped spring member 40 are positioned to engage the detent features 36 provided on the first and second sidewalls 32, 34 of the slot 30 in the first locking structure 20, whereby movement of the carrier 50 in the direction of the arrows 60 shown in FIGS. 4A and 4B causes the first and second arms 42, 44 of the spring member 40 to deform inwardly toward an axial centerline 62 of the spring member 40 as the carrier 50 is advanced along the slot 30. When the terminal ends 46, 48 of the spring member 40 arrive at the next successive detent feature 36, the first and second arms 42, 44 of the spring member 40 are biased in directions outwardly from the axial centerline 62 and engage the corresponding detent features 36 so that movement of the second locking structure 22 in a direction opposite the arrow 60 is prevented.

The detent features 36 of the first locking structure 20 may be of any configuration suitable to permit the carrier 50 of the second locking structure 22 to be moved along the slot 30 in a direction that expands the diameter of sleeve 12 while deforming the spring member 40 as described above, and thereafter allow the first and second terminal ends 46, 48 of the spring member 40 to engage the detent features 36 in a manner that prevents movement of the carrier 50 in the opposite direction. In the embodiment depicted in FIG. 4A, for example, the detent features 36 comprise serrations 36a formed into the respective sidewalls 32, 34 of the slot 30. The serrations 36a may include two or more angled surfaces configured to facilitate movement of the second locking structure 22 along the slot 30 during expansion of the sleeve 12, while preventing movement in the opposite direction. In the embodiment shown, each serration 36a includes a first surface 64 that is angled to facilitate movement of the first and second terminal ends 46, 48 from one serration to the next as the carrier 50 is moved in the direction of the arrow 60, and a second surface 66 is angled, such as perpendicular to the longitudinal axis of the slot 30, to provide secure engagement of the terminal ends 46, 48, whereby movement of carrier 50 in the direction opposite the arrow 60 is prohibited. FIG. 4B depicts another exemplary detent structure 36 in the form of saw-tooth shapes 36b defining alternating peaks 68 and valleys 70 for engaging the spring member 40 of the second locking structure 22 as described above.

With reference to FIG. 3, the carrier 50 of the second locking structure 22 may further include at least two oppositely disposed side legs 72, 74 extending outwardly from the plane of the base 52 and along opposite side edges thereof. The side legs 72, 74 are sized and arranged to engage the inner surface of the sleeve 12 near the sidewalls 32, 34 of the slot 30 of the first locking structure 20 to thereby facilitate sliding movement of the carrier 50 along the slot 30 during expansion of the sleeve 12, and to maintain a spacing of the base 52 from the inner wall of the sleeve 12. The carrier 50 may further include at least one guide member 76, 78 extending outwardly from the plane of the base 52. In the embodiment shown, the carrier 50 includes first and second guide members 76, 78 provided on oppositely disposed sides of the base 52 and arranged for substantial alignment with the axial centerline 62 of the spring member 40 in the assembled condition of the second locking structure 22. The first and second guide members 76, 78 are positioned and arranged on the base 52 to align with and engage the oppositely disposed sidewalls 32, 34 of the slot 30 and thereby facilitate guiding the second locking structure 22 along the slot 30 during expansion of the sleeve 12 toward the second condition.

The second locking structure 22 may further include at least one aperture 80 through the base 52 of the carrier 50 to facilitate selectively disengaging the spring member 40. As best depicted in FIGS. 4A-4B, the illustrated embodiment includes first and second apertures 80 through the base 52 of the carrier 50 and positioned such that at least a portion of the spring member 40 is accessible through the apertures 80 to facilitate disengaging the spring member 40 by moving one or more of the first and second legs 42, 44 of the spring member 40 away from the detent structure 36. By disengaging the spring member 40 in this manner, the second locking structure 22 may then be moved relative to the first locking structure 20 in a direction to reduce the diameter of the sleeve 12 and facilitate movement and/or removal of the pipe seal 10 from an installation within a pipe.

Referring again to FIG. 1, the pipe seal 10 may further include sealing structure 82 disposed on at least a portion of the outer surface of the sleeve 12. In the embodiment shown, the sealing structure 82 covers the entire circumferential surface of the sleeve 12 and extends beyond the first and second axial ends 24, 26 of the sleeve 12. As the sleeve 12 of the pipe seal 10 is expanded within a pipe, the sealing member 82 is compressed against the inner wall of the pipe to seal the leaking location. The sealing structure 82 may further include at least one circumferentially extending ring 84, 86 to facilitate sealing a leaking pipe. In the embodiment shown, the sealing structure 82 includes first and second rings 84, 86 provided adjacent the respective first and second axial ends 24, 26 of the sleeve 12. It will be appreciated, however, that a single ring, or more than two rings, may alternatively be provided to enhance the sealing ability of the pipe seal 10, as may be desired.

Figure 2A:
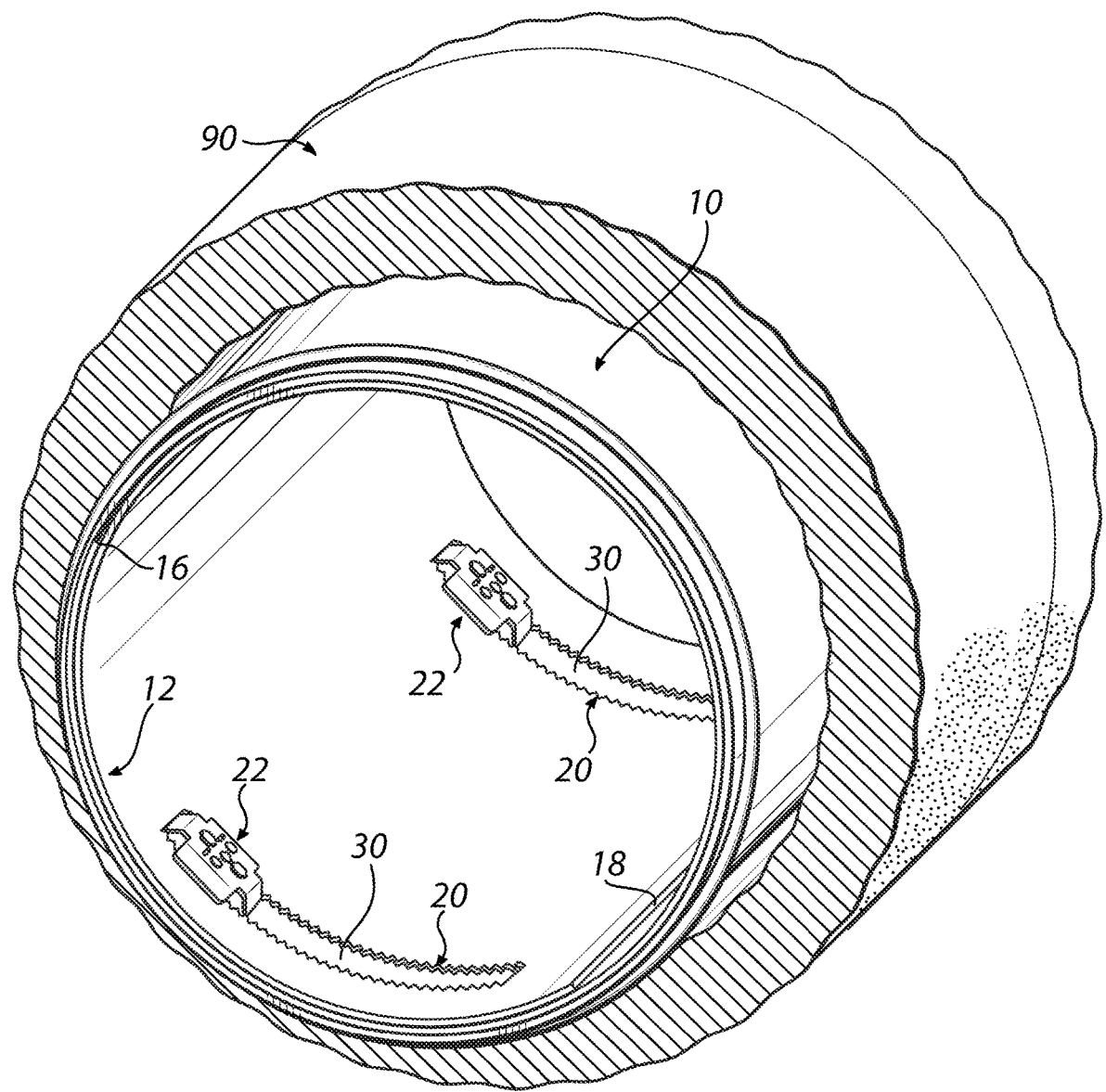
FIG. 2A is a perspective view illustrating the exemplary pipe seal of FIG. 1 installed within a pipe and shown in an unexpanded condition.
Figure 2B:
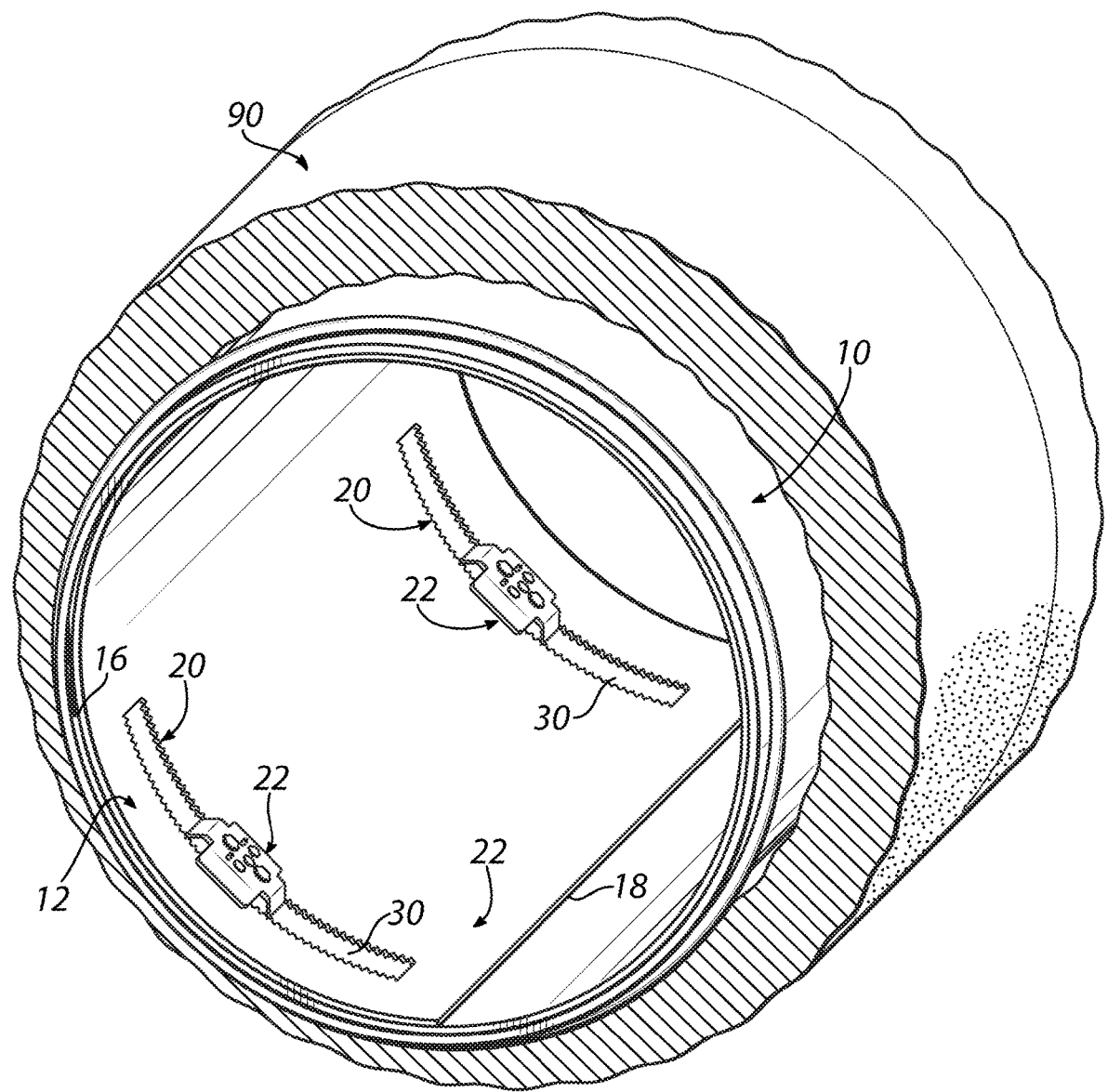
FIG. 2B is a perspective view similar to FIG. 2A, and illustrating the pipe seal in an expanded condition.

In use, an exemplary pipe seal 10 in accordance with the present disclosure may be inserted within the inner diameter of a pipe 90 while the expandable sleeve 12 of the pipe seal 10 is in the first, compact configuration, as depicted in FIG. 2A. When the pipe seal 10 is located at a position within the pipe 90 that needs to be repaired, the sleeve 12 may be expanded from the first, compact configuration to a second, expanded configuration having a larger outer diameter by moving the second locking structure 22 along the slot 30 of the first locking structure 20 as generally depicted in FIG. 2B. As the second locking structure 22 is moved along the slot 30, the spring member 40 of the second locking structure 22 engages the detent features 36 as described above with reference to FIGS. 4A-4B. When the sleeve 12 has been fully expanded to compress the sealing structure 82 against the inner surface of the pipe 90, the spring member 40 of the second locking structure 22 prevents movement of the second locking structure 22 along the slot 30 in a direction that would reduce the diameter of the sleeve 12.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. An expandable pipe seal, comprising:
    an expandable sleeve, the sleeve formed from sheet material rolled into a cylindrical shape such that a first longitudinal edge of the sheet overlaps a second longitudinal edge of the sheet in a circumferential direction of the sleeve, the sleeve having first and second axial ends;
    the sleeve expandable from a first, compact configuration to a second, expanded configuration having a larger outer diameter than the first configuration;
    at least one first locking structure on the sleeve, the first locking structure comprising an elongate slot adjacent an axial end of the sleeve and extending in a circumferential direction from the second longitudinal edge toward the first longitudinal edge, the slot defining first and second oppositely disposed sides, each side of the slot including a plurality of detent features; and
    at least one second locking structure coupled proximate the first longitudinal edge of the rolled sheet and cooperating with the first locking structure to maintain the sleeve in the second, expanded configuration;
    the second locking structure comprising a spring member formed into a V-shape and having first and second spaced apart terminal ends;
    the first and second terminal ends of the spring member operatively engaging the detent features of the first locking structure such that the spring member deforms to facilitate expansion of the sleeve from the first configuration toward the second configuration, and the terminal ends of the spring member engage the detent features to prevent movement of the sleeve in a direction toward the first configuration;
    wherein the second locking structure further comprises:
        a carrier, and
        spring capture structure on the carrier, the spring capture structure configured to receive and position the spring member for engagement with the first locking structure;
    wherein the spring capture structure comprises a plurality of pins coupled with the carrier; and
    wherein the spring member is positioned on the carrier for engagement with the pins.

2. The pipe seal of claim 1, wherein the detent features comprise at least one of notches or teeth.

3. The pipe seal of claim 1, further comprising:
    sealing structure disposed on at least a portion of an outer surface of the sleeve.

4. The pipe seal of claim 3, wherein the sealing structure comprises at least one circumferentially extending ring.

5. The pipe seal of claim 3, wherein the sealing structure comprises a tubular sealing material surrounding substantially the entire outer surface of the sleeve.

6. The pipe seal of claim 1, wherein the carrier comprises:
    a generally planar base; and
    at least two side legs extending outwardly from the plane of the base along opposite side edges thereof;
    the at least two side legs engaging the inner surface of the sleeve in an assembled condition of the pipe seal.

7. The pipe seal of claim 6, wherein the carrier further comprises:
    at least one guide member extending outwardly from the plane of the base;
    the at least one guide member positioned and arranged to engage the oppositely disposed sides of the slot such that the second locking structure is guided along the slot during expansion of the sleeve toward the second configuration.

8. The pipe seal of claim 1, wherein the second locking structure further comprises:
at least one fastener operatively coupled with the carrier and an outer overlapping layer of the rolled sheet, and securing the carrier thereto.

9. The pipe seal of claim 8, wherein the at least one fastener cooperates with the spring capture structure on the carrier to receive and position the spring member for engagement with the first locking structure.

10. The pipe seal of claim 1, further comprising:
at least one aperture through the carrier, the at least one aperture positioned and arranged such that at least a portion of the spring member is accessible through the aperture to disengage the spring member from the detent features of the first locking structure.

11. A locking device for use with a pipe seal having an expandable sleeve including first locking structure in the form of a slot with a plurality of detent features, the locking device comprising:
a carrier; and
a spring member supported on the carrier, the spring member formed into a V-shape with first and second spaced apart terminal ends;
the terminal ends configured such that, in an installed condition on the sleeve, the first and second terminal ends of the spring member operatively engage the detent features of the first locking structure such that the spring member is deformable to facilitate expansion of the sleeve from a first, compact configuration toward a second radially expanded configuration, and the terminal ends of the spring member engage the detent features under a bias force of the spring member to prevent movement of the sleeve in a direction toward the first configuration;
wherein the locking device further comprises spring capture structure on the carrier, the spring capture structure configured to receive and position the spring member for engagement with the first locking structure in an installed condition on the sleeve;
wherein the spring capture structure comprises a plurality of pins coupled with the carrier; and
wherein the spring member is positioned on the carrier for engagement with the pins.

12. A method of sealing a pipe, the method comprising:
inserting an expandable sleeve into the inner diameter of the pipe, the sleeve including first locking structure having a plurality of detent features;
expanding the sleeve from a first, compact configuration to a second, expanded configuration having an inner diameter greater than the first configuration; and
locking the sleeve in the second configuration by engaging the detent features with first and second spaced apart terminal ends of a second locking structure comprising a spring member formed into a V-shape to define the first and second terminal ends;
the spring member received and positioned on a carrier of the second locking structure by a plurality of pins coupled with the carrier.

13. The method of claim 12, wherein expanding the sleeve from the first configuration to the second configuration comprises:
deforming the spring member such that the first and second terminal ends move toward one another; and
moving the first and second terminal ends outwardly via a biasing force of the spring member such that the first and second terminal ends each engage at least one successive detent feature.

\* \* \* \* \*